(12) United States Patent  (10) Patent No.: US 8,173,190 B2
Singer et al.  (45) Date of Patent: May 8, 2012

(54) NON-SETTLING FRUIT BEVERAGES AND METHODS OF MAKING NON-SETTLING FRUIT BEVERAGES

(76) Inventors: Evan Singer, Ross, CA (US); John Linehan, San Francisco, CA (US)

(*) Notice: Subject to any disclaimer, the term of this patent is extended or adjusted under 35 U.S.C. 154(b) by 800 days.

(21) Appl. No.: 11/322,445

(22) Filed: Dec. 29, 2005

(65) Prior Publication Data

US 2007/0092626 A1  Apr. 26, 2007

Related U.S. Application Data

(63) Continuation-in-part of application No. 10/998,531, filed on Nov. 29, 2004, now abandoned.

(60) Provisional application No. 60/640,081, filed on Dec. 29, 2004.

(51) Int. Cl.
*A23L 2/00* (2006.01)

(52) U.S. Cl. .................. 426/393; 426/524; 426/599

(58) Field of Classification Search .................. 426/393, 426/524, 590, 599
See application file for complete search history.

(56) References Cited

U.S. PATENT DOCUMENTS

| | | | |
|---|---|---|---|
| 3,647,472 A * | 3/1972 | Speech et al. ................. | 426/115 |
| 4,561,782 A | 12/1985 | Jacobsen et al. | |
| 4,676,988 A * | 6/1987 | Efstathiou et al. ............. | 426/271 |
| 5,225,221 A | 7/1993 | Camden et al. | |
| 5,302,021 A | 4/1994 | Jennett et al. | |
| 5,474,793 A | 12/1995 | Meyer et al. | |
| 5,597,595 A | 1/1997 | Dewille et al. | |
| 5,641,531 A | 6/1997 | Liebrecht et al. | |
| 5,950,448 A | 9/1999 | Barnes et al. | |
| 5,976,588 A | 11/1999 | Vincent | |
| 6,045,254 A * | 4/2000 | Inbar et al. .................... | 366/130 |
| 6,090,426 A | 7/2000 | Vincent | |
| 6,106,874 A | 8/2000 | Liebrecht et al. | |
| 6,171,633 B1 * | 1/2001 | Dulebohn et al. ............ | 426/580 |
| 6,176,090 B1 | 1/2001 | Ufema | |
| 6,228,415 B1 * | 5/2001 | Jimenez-Laguna et al. .. | 426/565 |
| 6,242,037 B1 | 6/2001 | Vincent | |
| 6,273,292 B1 | 8/2001 | Milan | |
| 6,283,627 B1 | 9/2001 | Fromm | |
| 6,352,734 B1 | 3/2002 | Martin, Jr. et al. | |
| 6,432,466 B2 | 8/2002 | Brake et al. | |
| 6,465,034 B2 | 10/2002 | Farrell | |
| 6,474,862 B2 | 11/2002 | Farrell | |
| 6,527,433 B2 | 3/2003 | Daniels, Jr. | |
| 6,607,775 B2 | 8/2003 | Aldred et al. | |
| 6,720,020 B2 | 4/2004 | Karleskind et al. | |

(Continued)

FOREIGN PATENT DOCUMENTS

WO  WO98/43487  * 10/1998

OTHER PUBLICATIONS

Kelly. Recipe: Beverage Recipes, "Breakfast Smoothie". May 21, 2000. pp. 1-40. http://www.recipelink.com/msgbrd/board_31/2000/MAY/1956.html.*

(Continued)

*Primary Examiner* — Kelly Bekker
(74) *Attorney, Agent, or Firm* — Casimir Jones SC (57) ABSTRACT

The present invention relates to non-settling fruit beverages (e.g., smoothies), including processes for making non-settling fruit beverages. In particular, the present invention provides processes for making storable non-settling fruit beverages.

16 Claims, 4 Drawing Sheets

U.S. PATENT DOCUMENTS

| | | | |
|---|---|---|---|
| 6,732,771 B2 | 5/2004 | Gispert Casino et al. | |
| 6,793,952 B2 | 9/2004 | Fenn et al. | |
| 6,805,543 B2 | 10/2004 | Fux et al. | |
| 6,811,804 B2 | 11/2004 | Patel et al. | |
| 6,817,281 B2 | 11/2004 | Gruenewald et al. | |
| 2001/0053404 A1* | 12/2001 | Powrie et al. | 426/599 |
| 2003/0134009 A1* | 7/2003 | O'Donnell Kiely | 426/91 |
| 2004/0118710 A1* | 6/2004 | Bourque et al. | 206/219 |

OTHER PUBLICATIONS

Arao. JP Application 2001299298A Absract Only. Oct. 30, 2001. pp. 1-2.*

* cited by examiner

NON-SETTLING FRUIT BEVERAGES AND METHODS OF MAKING NON-SETTLING FRUIT BEVERAGES

The present invention is a continuation-in-part application of U.S. patent application Ser. No. 10/998,531, filed Nov. 29, 2004 and also claims priority to U.S. Provisional Pat. Appln. Ser. No. 60/640,081, filed Dec. 29, 2004, the disclosures of which are herein incorporated by reference in their entireties.

FIELD OF THE INVENTION

The present invention relates to non-settling fruit beverages (e.g., smoothies), including processes for making non-settling fruit beverages. In particular, the present invention provides processes for making storable non-settling fruit beverages.

BACKGROUND OF THE INVENTION

Smoothies have become increasingly popular. In U.S. Pat. No. 6,273,292, incorporated herein by reference in its entirety, Michael Milan writes, "Within recent years, there has been another form of beverage that is experiencing a reasonable degree of acceptance by the population. This form of beverage is a fruit juice or fruit drink that is blended with crushed ice. If the fruit drink includes yogurt or ice cream, it is termed a smoothie. A smoothie is non-carbonated and generally contains fruit or a mixture of different fruits that are pulverized to almost a liquid form which is served at a freezing temperature to include ice crystals. At times, a smoothie may also include powdery supplements. For purposes of this invention, the term smoothie is to refer to any non-carbonated fruit or fruit juice beverage that includes ice crystals. The normal method of preparing a smoothie is to place the ingredients within a blender and blend the ingredients for a few seconds which results in the ice being pulverized and evenly dispersed throughout the ingredients. The blended ingredients are then poured into consuming containers, such as a glass or cup, and the contents then consumed by the consumer." Popular smoothies that consumers can purchase at on-premise retail outlets like Jamba Juice™ or Smoothie King™ have a much desired, paste-like consistency that is smooth, creamy, and thick. These retailers make their smoothies at the time of order using a blender. Consumers must consume the smoothie quickly, before the ice crystals melt, or the smoothie will cease to have a paste-like consistency that is smooth, creamy, and thick. Instead, the drink will become watery because the ice crystals will have melted. If the consumer does not finish the smoothie and wants to drink the rest later, or if they purchase a smoothie and simply want to drink it at a later date or time, they will not be able to duplicate the much desired, paste-like consistency that is smooth, creamy, and thick. If the consumer freezes the smoothie, hoping to stop the ice crystals from melting, the smoothie must be thawed in order to drink it. When it thaws, either at room temperature or by using a heat source or microwave oven, the ice crystals will quickly melt and the drink will have a watery consistency instead of the desired paste-like and smooth, creamy and thick consistency.

Smoothies with such a paste-like, smooth, creamy, and thick consistency can also be made at home. A blender must be used to achieve this desired consistency. However, blenders are not ubiquitous, and they are difficult and time consuming to clean. Additionally, it is time consuming to make a smoothie at home; it takes several minutes to measure, combine and blend the ingredients. Further, unless a consumer has all of the necessary ingredients and unless a recipe is followed exactly each time, it is difficult to get both the taste and the paste-like, smooth, creamy and thick consistency right every time a smoothie is made at home. For these reasons, smoothies are not made at home as often as they could be. Additionally, similar to smoothies purchased at on-premise retail stores, smoothies made at home and stored in the freezer will lose their paste-like, smooth, creamy and thick consistency when thawed.

There is a need for a smoothie with a paste-like, smooth, creamy and thick consistency that can be stored in a freezer and consumed whenever desired. Additionally, there is a need for a smoothie with a paste-like, smooth, creamy and thick consistency made at home that does not need to be blended in a home blender by a consumer. Additionally, there is a need for a smoothie that can easily be made at home with the desired taste and desired consistency each time the smoothie is made. Additionally, there is a need for a smoothie that can be made at home with all of the necessary ingredients in one package. Finally, there is a need for a smoothie that can be made at home quickly. Additionally, there is a need for a smoothie that a consumer can purchase in the frozen section of a grocery store, and with minimal effort, prepare the smoothie to taste similar and have the same consistency as a smoothie purchased at an on-premise smoothie retail outlet. However, smoothies with these attributes are unknown in the art.

DESCRIPTION OF THE FIGURES

FIG. 6 also shows the sorbet and frozen yogurt 64 that has been filled in the middle of the container 60 to form an inner core. The blended mixture 63 and the sorbet and frozen yogurt 64 are covered with a plastic liner 65 to stay fresh. Additionally, FIG. 6 shows a removable inner plastic layer 62 that can be put in the microwave, a straw 71 to consume the smoothie, and a mark 70 that shows how much volume should be increased when air is mixed into the smoothie.

SUMMARY OF THE INVENTION

The present invention relates to a process for preparing a non-settling fruit beverage with a paste-like, smooth, creamy and thick consistency with ice crystals that can be stored in a freezer and consumed whenever desired. Additionally, the present invention relates to a process for preparing a non-settling fruit beverage with a paste-like, smooth, creamy and thick consistency with ice crystals that can be made at home that does not need to be blended in a home blender by a consumer. Additionally, the present invention relates to a process for preparing a non-settling fruit beverage that can easily be made at home with consistent good taste and consistency. Additionally, the present invention relates to a process for preparing a non-settling fruit beverage that can be made at home with all of the necessary ingredients in one package. Additionally, the present invention relates to a process for preparing a non-settling fruit beverage that can be made at home quickly. Additionally, the present invention relates to a process for making a non-settling fruit beverage that can be purchased in the frozen section of a grocery store, and with minimal effort, can be prepared to have a similar taste and consistency as a non-settling fruit beverage purchased at an on-premise non-settling fruit beverage retail outlet. The present invention also provides non-settling fruit beverages having the above-described properties. For example, the present invention provides frozen non-settling fruit beverages configured to allow preparation into a paste-like, smooth, creamy, and thick consistency with ice crystals.

A preferred process for preparing a non-settling fruit beverage with the above mentioned attributes comprises one or more of the steps of: blending fruit, ice, and liquid together at high speed for a period of time sufficient to form a blended mixture paste with ice crystals; placing this blended mixture in a container; placing a base in a container; freezing and storing the blended mixture and the base for a period of time; and thawing the blended mixture to the point when it can be mixed (e.g., manually mixed) together with the base to form a smooth, creamy, thick, paste-like consistency. The non-settling fruit beverage is then ready to be consumed.

A second embodiment for preparing a non-settling fruit beverage with the above mentioned attributes comprises one or more of the steps of: blending fruit and liquid together at high speed for a period of time sufficient to form blended mixture comprising a slurry; freezing the blended mixture and agitating it during the freezing process so that ice crystals form; placing the blended mixture in a container; placing a base in a container; storing the blended mixture and base below freezing temperature (e.g., below 32 degrees Fahrenheit); and thawing the blended mixture until it can be mixed together with the base to form a smooth, creamy, thick, paste-like consistency. The non-settling fruit beverage is then ready to be consumed.

Another embodiment for preparing a non-settling fruit beverage with the above mentioned attributes comprises one or more of the steps of: blending fruit and liquid together at high speed for a period of time sufficient to form a blended mixture comprising a slurry; placing the blended mixture in a container; placing a base in a container; freezing and storing the blended mixture and base below freezing temperature (e.g., below 32 degrees Fahrenheit) so that ice crystals form; and thawing the blended mixture until it can be mixed together with the base to form a smooth, creamy, thick, paste-like consistency. The non-settling fruit beverage is then ready to be consumed.

Another embodiment for preparing a non-settling fruit beverage with the above mentioned attributes comprises one or more of the steps of: blending fruit, one or a plurality of which is previously frozen, and liquid together at high speed for a period of time sufficient to form blended mixture comprising a slurry with ice crystals; placing the blended mixture in a container; placing a base in a container; freezing and storing the blended mixture and base below freezing temperature (e.g., below 32 degrees Fahrenheit); and thawing the blended mixture until it can be mixed together with the base to form a smooth, creamy, thick, paste-like consistency. The non-settling fruit beverage is then ready to be consumed.

Yet another embodiment for preparing a non-settling fruit beverage with the above mentioned attributes comprises one or more of the steps of: blending fruit, ice, liquid, and a frozen base together at high speed for a period of time sufficient to form blended mixture comprising a paste with ice crystals; agitating this blended mixture; freezing and storing the blended mixture; and thawing the blended mixture until it can be mixed together to a smooth, creamy, thick, paste-like consistency. The non-settling fruit beverage is then ready to be consumed.

Still another embodiment for preparing a non-settling fruit beverage with the above mentioned attributes comprises one or more of the steps of: blending fruit and ice together at high speed for a period of time sufficient to form a blended mixture comprising a paste with ice crystals; placing this blended mixture in a container; placing a base in a container; freezing and storing the blended mixture and the base; thawing the blended mixture; and combining the blended mixture and base, adding a liquid, and mixing the combination together to a smooth, creamy, thick, paste-like consistency. The non-settling fruit beverage is then ready to be consumed.

Still another embodiment for preparing a non-settling fruit beverage with the above mentioned attributes comprises one or more of the steps of: blending fruit, one or a plurality of which is previously frozen, at high speed for a period of time sufficient to form a blended mixture comprising a paste with ice crystals; placing this blended mixture in a container; placing a base in a container; freezing and storing the blended mixture and the base; thawing the blended mixture; and combining the blended mixture and base, adding a liquid, and mixing the combination together to a smooth, creamy, thick, paste-like consistency. The non-settling fruit beverage is then ready to be consumed.

The present invention also relates to a system for mixing and drinking beverages. The system comprises a straw that has a rigid hollow support that is used for drinking and has rigid extensions attached that are used for mixing. The straw may be included along with, or in, a container housing a frozen non-settling fruit beverage of the present invention.

As used herein the term "non-settling fruit beverage" refers to beverages having paste-like, smooth, creamy and thick consistency and containing blended fruit mixed with ice crystals under conditions such that the fruit component does not noticeably settle out of the mixture. Non-settling fruit beverages are often referred to as "smoothies." If the ice crystal component substantially melts, components of the beverage may settle out over time.

Thus, preferred embodiments of the present invention include, but are not limited to, the following methods and compositions:

A process for preparing a non-settling fruit beverage comprising the steps of:
 a. blending fruit, ice, and liquid together a period of time sufficient to form a blended mixture comprising paste with ice crystals,
 b. placing blended mixture resulting from step (a) in a first container,
 c. placing a base in a second container or in a portion of said first container not occupied by said blended mixture,
 d. freezing and storing said blended mixture and said base below 32 degrees Fahrenheit,
 e. thawing said blended mixture until it can be mixed together with said base to a desired consistency when said non-settling fruit beverage is ready to be consumed.

The above process, wherein one or a plurality of spoons, forks, and other kitchen utensils are used to mix said blended mixture and said base together to a desired consistency when said non-settling fruit beverage is ready to be consumed.

The above process, wherein thawing of said blended mixture occurs through one or a plurality of the following: sitting at room temperature; being inside, on or near a heat source; and using a microwave oven.

The above process, wherein said base is thawed before being mixed with said blended mixture.

The above process, wherein said blended mixture is thawed for a longer period of time than said base.

The above process, wherein said blended mixture is blended for a sufficient period of time to form a smooth paste substantially void of any fruit or ice chunks.

The above process, wherein said blending is performed at one or a plurality of speeds.

The above process, wherein said blended mixture additionally comprises a supplement including one or a plurality of vitamins, minerals, herbs, protein, fiber, botanicals, teas, bioflavonoids, weight loss supplements, non-prescription drugs, and medicinals.

The above process, wherein said blended mixture additionally comprises one or a plurality of natural sweeteners, artificial sweeteners, coconut, peanut butter, nut butters, nuts, coffee, espresso, caffeine, chocolate, vanilla, cinnamon, spices, rhubarb, natural flavors, artificial flavors, natural coloring, artificial coloring, yogurt, oat bran, wheat bran, bran, whey, oil, seeds, pectin, cellulose, potatoes, preservatives, carrageenan, and wheatgrass.

The above process, wherein said fruit is previously frozen.

The above process, wherein said fruit comprises one or a plurality of bananas, raspberries, blueberries, blackberries, strawberries, pineapples, cherries, peaches, passion fruit, mangos, papayas, guavas, apples, pears, boysenberries, gooseberries, star-fruit, apricots, plums, grapes, nectarines, pomegranates, limes, lemons, oranges, marionberries, and cranberries.

The above process, wherein said ice is previously crushed.

The above process, wherein said liquid contains one or a plurality of fruit juice, fruit nectar, fruit puree, apple sauce, fruit cider, vegetable juice, vegetable nectar, vegetable puree, water, juice concentrate, alcohol, non-dairy based milk such as soy or rice milk, dairy based milk such as cow milk, non-dairy based cream, and dairy-based cream.

The above process, wherein said liquid comprises one or a plurality of natural sweeteners and artificial sweeteners.

The above process, wherein more of said liquid is additionally added during the mixing of said blended mixture with said base.

The above process, wherein the total volume of said blended mixture and said base decreases after the blended mixture is thawed and mixed with said base.

The above process, wherein said volume decreases to a specified level.

The above process, wherein said blended mixture is frozen and crushed before it is placed in said first container.

The above process, wherein said base is frozen prior to being placed in said second container.

The above process, wherein said base comprises one or a plurality of: sherbet, frozen yogurt, sorbet, dairy-based ice cream, and non dairy-based ice cream such as ice cream made from soy or rice.

The above process, wherein said base is low in natural or artificial sugars.

The above process, wherein said non-settling fruit beverage is low in or free of one a plurality of: natural sugars, artificial sugars, fat, carbohydrates, acid, gluten, lactose and calories.

The above process, wherein said base additionally comprises a supplement including one or a plurality of: vitamins, minerals, herbs, protein, fiber, botanicals, teas, bioflavonoids, non-prescription drugs, and medicinals.

The above process, wherein said base additionally comprises one or a plurality of natural sweeteners, artificial sweeteners, coconut, peanut butter, nut butters, nuts, coffee, espresso, chocolate, vanilla, cinnamon, spices, rhubarb, natural flavors, artificial flavors, natural coloring, artificial coloring, yogurt, oat bran, wheat bran, bran, whey, oil, seeds, pectin, cellulose, potatoes, preservatives, carrageenan, and wheatgrass.

The above process, wherein said blended mixture and said base are frozen and stored below 20 degrees Fahrenheit (e.g., to extend shelf life).

The above process, wherein said blended mixture and said base are frozen and stored below 0 degrees Fahrenheit.

The above process, wherein said blended mixture and said base are frozen and stored below minus 10 degrees Fahrenheit.

The above process, wherein one or more components (e.g., blended mixture, base, combination thereof) are flash frozen (e.g., via pressure freezing, exposure to extreme low temperature, etc.).

The above process, wherein the shelf life of said non-settling fruit beverage is at least 6 months.

The above process, wherein the shelf life of said non-settling fruit beverage is at least 12 months.

The above process, wherein the shelf life of said non-settling fruit beverage is at least 24 months.

The above process, wherein said blended mixture and said base comprise one or a plurality of ingredients that are organic.

The above process, wherein said blended mixture and said base comprise one or a plurality of ingredients that are all-natural.

The above process, wherein said blended mixture and said base are mixed before consumption by one or a plurality of being: crushed, smashed, churned, stirred, and shaken.

The above process, wherein said blended mixture and said base are mixed before consumption by manually spinning blades or fins inside the container.

The above process, wherein said blades are spun by one or a plurality of the following means: turning, pumping or cranking a handle, moving a lever up, moving a lever down, moving a lever up and down, and by pulling a tab.

The above process, wherein said blended mixture and said base are mixed to achieve desired consistency in 30 seconds or less.

The above process, wherein said blended mixture and said base are mixed to achieve desired consistency in 15 seconds or less.

The above process, wherein said blended mixture and said base are mixed to achieve desired consistency in 5 seconds or less.

The above process, wherein said blended mixture and said base are mixed to add air to said blended mixture and said base to aid in achieving desired consistency of said smoothie.

The above process, wherein enough air is added to said blended mixture and said base to increase overall volume.

The above process, wherein said volume increases to a specified level.

The above process, wherein a rigid straw with rigid extensions such as fins is used to mix said blended mixture and said base, and is used to consume said smoothie.

The above process, wherein said first and second containers are stored inside a third container.

The above process, wherein after said blended mixture is thawed, said blended mixture and said base are transferred to said third container and mixed until desired consistency is attained.

The above process, wherein said smoothie is consumed from said third container.

The above process, wherein said rigid straw with rigid extensions is stored in said third container, used to mix said blended mixture and said base, and consume said smoothie.

The above process, wherein said first, second and third containers comprises one or a plurality of plastic, paper, cardboard, Styrofoam, metal, expanded polystyrene, other insulated synthetic materials, and other non-insulated synthetic materials.

The above process, wherein said third container comprises one or a plurality of layers.

The above process, wherein said first, second and third containers are cylindrical in shape and open on the top, similar to a cup.

The above process, wherein said first, second and third containers are sealed with covers.

The above process, wherein said cover for said third container has a hole for a straw.

The above process, wherein a straw is either contained within or attached to said third container.

The above process, wherein said third container holds 16 fluid ounces.

The above process, wherein said third container holds 24 fluid ounces.

The above process, wherein said first and second containers are in the shape of a pouch.

The above process, wherein a powder or liquid supplement comprising one or a plurality of vitamins, minerals, herbs, protein, fiber, botanicals, teas, bioflavonoids, non-prescription drugs, and medicinals is additionally added to said blended mixture and said base while they are being mixed but before the smoothie is consumed.

The above process, wherein said powder or liquid supplement is contained within a fourth container such as a pouch, said fourth container is either attached or contained within first, second or third containers.

The above process, wherein said blended mixture and said base are frozen using a multiple track freeze methodology that freezes said blended mixture and said base in-line and in-proportion to what is needed to fill said first and second containers.

The above process, wherein said first and second containers are microwavable.

The above process, wherein said first container containing said blended mixture is agitated while said blended mixture is being frozen.

The above process, wherein said blended mixture and said base are mechanically placed in said first and second containers with nozzles.

The above process, wherein one or a plurality of said nozzles are extrusion nozzles.

The above process, wherein said smoothie contains the necessary ingredients to be consumed as a meal replacement including but not limited to one or a plurality of: calories, protein, carbohydrates, fats, minerals, and vitamins.

The above process, wherein said base is placed in said first container.

The above process, wherein a rigid straw with rigid extensions is placed in said first container prior to said blended mixture and said base being frozen and stored.

The above process, wherein said rigid straw is used to mix said blended mixture and said base, and to consume said non-settling fruit beverage.

The above process, wherein said blended mixture and said base are thawed together before being mixed through one or a plurality of the following: sitting at room temperature; being inside, on or near a heat source; and using a microwave oven.

The above process, wherein after being thawed, said blended mixture and said base are mixed in said first container and then consumed from said first container.

The above process, wherein said first container is single serve sized container.

The above process, wherein said first container comprises one or a plurality of plastic, paper, air, cardboard, Styrofoam, metal, expanded polystyrene, other insulated synthetic materials, and other non-insulated synthetic materials.

The above process, wherein said first container comprises one or a plurality of layers.

The above process, wherein one or a plurality of said layers can be removed or separated from another one or a plurality of said layers.

The above process, wherein one or a plurality of said layers of said first container are microwavable.

The above process, wherein said first container is cylindrical in shape and open on the top.

The above process, wherein said first container has a tapered base so that the circumference of the bottom of the cup is smaller than the circumference of the top of the cup.

The above process, wherein said first container is sealed with a cover.

The above process, wherein said cover has a hole in it for a straw.

The above process, wherein a straw is attached to the outside of said first container.

The above process, wherein said first container holds 16 fluid ounces or less.

The above process, wherein said first container holds 24 fluid ounces or less.

The above process, wherein only enough of said blended mixture and said base are placed in said first container to fill half or less of said first container.

The above process, wherein only enough of said blended mixture and said base are placed in said first container to fill three quarters or less of said first container.

The above process, wherein said first container is in the shape of a pouch.

The above process, wherein said first container containing said blended mixture and said base is agitated before or while said first container and said blended mixture and said base are being frozen.

The above process, wherein said blended mixture and said base are first combined and then placed in said first container.

The above process, wherein said blended mixture and said base are filled into said first container by one nozzle.

The above process, wherein said blended mixture and said base are individually placed in said first container.

The above process, wherein said blended mixture and said base are mechanically placed in said first container with nozzles.

The above process, wherein one or a plurality of said nozzles are extrusion nozzles.

The above process, wherein there is no or little space in between said base and said blended mixture inside said first container.

The above process, wherein said base and said blended mixture are placed next to each other so that said blended mixture forms an outer core and said base forms an inner core such that said blended mixture is placed against said first container walls and said base is placed against said blended mixture.

The above process, wherein said blended mixture is additionally placed on top of said base.

The above process, wherein said base and said blended mixture are placed next to each other so that said blended mixture forms an inner core and said base forms an outer core such that said base is placed against said first container walls and said blended mixture is placed against said base.

The above process, wherein said base and said blended mixture are placed next to each other so that said base forms an inner core shaped like a ball and said blended mixture surrounds (e.g., completely surrounds) said base on all sides.

The above process, wherein said base and said blended mixture are dispersed amongst each other in said first container.

The above process, wherein said base is placed in said first container at the same time, before or after said blended mixture is placed in said first container.

The above process, wherein after thawing, said blended mixture and said base are transferred to a fifth container and mixed until desired consistency is attained.

The above process, wherein said non-settling fruit beverage is consumed from said fifth container.

The above process, wherein said first container is stored inside said fifth container.

The above process, wherein said blended fruit, ice and liquid mixture and said base are frozen using a multiple track freeze methodology that freezes said blended mixture and said base in-line and in-proportion to what is needed to fill said first container.

The above process, wherein said blended mixture is frozen and crushed before it is put in said first container.

The above process, wherein said base is frozen prior to being placed in said first container.

A process for preparing a non-settling fruit beverage comprising the steps of:
 a. blending fruit and liquid together for a period of time sufficient to form a blended mixture comprising a slurry,
 b. freezing said blended mixture resulting from step (a) and agitating said blended mixture during freezing process so that ice crystals form,
 c. placing said blended mixture in a first container,
 d. placing a base in a second container or in a portion of said first container not occupied by said blended mixture,
 e. storing said blended mixture and said base below 32 degrees Fahrenheit,
 f. thawing said blended mixture until it can be mixed together with said base to a desired consistency when said non-settling fruit beverage is ready to be consumed.

A process for preparing a non-settling fruit beverage comprising the steps of:
 a. blending fruit and liquid together for a period of time sufficient to form a blended mixture comprising a slurry,
 b. placing said blended mixture in a first container,
 c. freezing said blended mixture resulting from step (a) and agitating said blended mixture during freezing process so that ice crystals form,
 d. placing a base in a second container or in a portion of said first container not occupied by said blended mixture,
 e. storing said blended mixture and said base below 32 degrees Fahrenheit,
 f. thawing said blended mixture until it can be mixed together with said base to a desired consistency when said non-settling fruit beverage is ready to be consumed.

A process for preparing a non-settling fruit beverage comprising the steps of:
 a. blending fruit and liquid together for a period of time sufficient to form a blended mixture comprising a slurry,
 b. placing said blended mixture in a first container,
 c. placing a base in a portion of said first container not occupied by said blended mixture,
 d. freezing said blended mixture and said base and agitating them during freezing process so that ice crystals form,
 e. storing said blended mixture and said base below 32 degrees Fahrenheit,
 f. thawing said blended mixture and said base until they can be mixed together to a desired consistency when said non-settling fruit beverage is ready to be consumed.

A process for preparing a non-settling fruit beverage comprising the steps of:
 a. blending fruit and liquid together for a period of time sufficient to form a blended mixture comprising a slurry,
 b. placing said blended mixture resulting from step (a) in a first container,
 c. placing a base in a second container or in a portion of said first container not occupied by said blended mixture,
 d. freezing and storing said blended mixture and said base below 32 degrees Fahrenheit so that ice crystals form, e. thawing said blended mixture until it can be mixed together with said base to a desired consistency when said non-settling fruit beverage is ready to be consumed.

A process for preparing a non-settling fruit beverage comprising the steps of:
a. blending fruit, one or a plurality of which is previously frozen, and liquid together for a period of time sufficient to form a blended mixture comprising a slurry with ice crystals,
b. placing said blended mixture resulting from step (a) in a first container,
c. placing a base in a second container or in a portion of said first container not occupied by said blended mixture,
d. freezing and storing said blended mixture and said base below 32 degrees Fahrenheit,
e. thawing said blended mixture until it can be mixed together with said base to a desired consistency when said non-settling fruit beverage is ready to be consumed.

A process for preparing a non-settling fruit beverage comprising the steps of:
a. blending fruit, ice, liquid, and a frozen base together for a period of time sufficient to form a blended mixture comprising a paste with ice crystals,
b. agitating said blended mixture resulting from step (a),
c. freezing and storing said blended mixture below 32 degrees Fahrenheit,
d. thawing said blended mixture until it can be manually mixed with a base to a desired consistency when said non-settling fruit beverage is ready to be consumed.

A process for preparing a non-settling fruit beverage comprising the steps of:
a. blending fruit and ice together at high speed for a period of time sufficient to form a blended mixture comprising paste with ice crystals,
b. placing blended mixture resulting from step (a) in a first container,
c. placing a base in a second container or in a portion of said first container not occupied by said blended mixture,
d. freezing and storing said blended mixture and said base below 32 degrees Fahrenheit,
e. thawing said blended mixture,
f. combining said blended mixture and said base, adding a liquid, and manually mixing the combination together to a desired consistency when said non-settling fruit beverage is ready to be consumed.

A process for preparing a non-settling fruit beverage comprising the steps of:
a. blending fruit, one or a plurality of which is previously frozen, together at high speed for a period of time sufficient to form a blended mixture comprising paste with ice crystals,
b. placing blended mixture resulting from step (a) in a first container,
c. placing a base in a second container or in a portion of said first container not occupied by said blended mixture,
d. freezing and storing said blended mixture and said base below 32 degrees Fahrenheit,
e. thawing said blended mixture,
f. combining said blended mixture and said base, adding a liquid, and manually mixing the combination together to a desired consistency when said non-settling fruit beverage is ready to be consumed.

A non-settling fruit beverage produced by any of the above processes.

A frozen beverage composition comprising a package housing ingredients for making a non-settling fruit beverage, said ingredients comprising: a) a blended mixture of fruit and ice crystals, and b) a base; wherein said blended mixture and said base are separated from each other.

The above composition, wherein said blended mixture is in a first container and said base is in a second container.

The above composition, wherein said blended mixture and said base are in the same container. A frozen beverage composition comprising a package housing ingredients for making a non-settling fruit beverage, said ingredients comprising: a) a blended mixture of frozen fruit, and b) a base; wherein said blended mixture and said base are separated from each other.

The above composition, further comprising a straw for mixing and consuming drinks, said straw comprising a rigid hollow support with rigid extensions attached.

DETAILED DESCRIPTION OF THE INVENTION

The present invention relates to a process for preparing a non-settling fruit beverage with a paste-like, smooth, creamy and thick consistency with ice crystals that can be stored in a freezer and consumed whenever desired and non-settling fruit beverages having such properties (e.g., frozen non-settling fruit beverages that can be sold frozen at stores or stored frozen at home). Additionally, it is preferred that the non-settling fruit beverage does not need to be blended in a home blender by a consumer. Additionally, it is preferred that the non-settling fruit beverage can easily be made at home and have a consistent good taste. Additionally, it is preferred that all of the necessary ingredients for the non-settling fruit beverage are in one package or container. Additionally, it is preferred that the non-settling fruit beverage can be made at home quickly.

In preferred embodiments, the non-settling fruit beverage comprises fruit, ice, liquid and a base. In other embodiments, the non-settling fruit beverage comprises additional ingredients.

In preferred embodiments, the non-settling fruit beverage is stored and consumed from one or a plurality of containers. Additionally, one or a plurality of non-settling fruit beverage ingredients are blended by the manufacturer before the non-settling fruit beverage is packaged.

There are many processes for blending and dispensing non-settling fruit beverage and other mixed drinks known in the art, including, but not limited to the systems described in U.S. Pat. Nos. 6,817,281, 5,950,448, 6,465,034, 6,474,862, 5,976,588, 6,090,426, 6,176,090, 6,283,627, 6,242,037 and 5,302,021, incorporated herein by reference in their entireties.

In some preferred embodiments, a spoon, a fork, or other rigid kitchen utensil is used crush, smash, churn, stir and mix the non-settling fruit beverage.

In yet other preferred embodiments, non-settling fruit beverage ingredients are thawed at room temperature, with the use of a heat source, or with the use of a microwave oven.

In other embodiments, parts of the non-settling fruit beverage ingredients are thawed for a longer period of time than others.

In preferred embodiments, the non-settling fruit beverage contains fruit, ice and liquid that are blended for a sufficient period of time to form a smooth paste void of few or any fruit or ice chunks.

In other embodiments, blending is performed at one or a plurality of speeds.

In still more embodiments, the non-settling fruit beverage comprises a supplement including one or a plurality of vitamins, minerals, herbs, protein, fiber, botanicals, teas, bioflavonoids, non-prescription drugs, weight-loss supplements, and medicinals or other ingredients known to, suspected of, or perceived of having health (physical or emotional) or nutritional benefits. There are a variety of processes for adding supplements to drinks known in the art, including, but not limited to the processes described in U.S. Pat. Nos. 5,641,531, 5,597,595, 6,720,020, and 6,811,804 incorporated herein by reference in their entireties.

In yet other embodiments, the non-settling fruit beverage comprises one or a plurality of natural sweeteners, artificial sweeteners, coconut, peanut butter, nut butters, nuts, coffee, espresso, caffeine, chocolate, vanilla, cinnamon, spices, rhubarb, natural flavors, artificial flavors, natural coloring, artificial coloring, yogurt, oat bran, wheat bran, bran, whey, oil, seeds, pectin, cellulose, potatoes, preservatives, carrageenan, and wheatgrass.

In other embodiments, the non-settling fruit beverage is made from fruit that is previously frozen. There are many processes to freeze fruit known in the art including, but not limited to the process described in U.S. Pat. No. 6,793,952, incorporated herein by reference in its entirety.

In still other embodiments, the fruit in the non-settling fruit beverage comprises one or a plurality of bananas, raspberries, blueberries, blackberries, strawberries, pineapples, cherries, peaches, passion fruit, mangos, papayas, guavas, apples, pears, boysenberries, gooseberries, star-fruit, apricots, plums, grapes, nectarines, pomegranates, limes, lemons, oranges, marionberries, and cranberries.

In another embodiment, the ice used to prepare the non-settling fruit beverage is crushed.

In other embodiments, the liquid in the non-settling fruit beverage comprises one or a plurality of fruit juice, fruit nectar, fruit puree, apple sauce, fruit cider, vegetable juice, vegetable nectar, vegetable puree, water, juice concentrate, alcohol, non-dairy based milk such as soy or rice milk, dairy based milk such as cow milk, non-dairy based cream, and dairy-based cream. For example, a variety of juices and fruit bases are known in the art that can be combined in a drink including, but not limited to the product described in U.S. Pat. No. 6,106,874, incorporated herein by reference in its entirety. In some embodiments, the liquid has supplements in it. There are a variety of processes for adding vitamins, minerals and other supplements to liquid known in the art including, but not limited to the processes described in U.S. Pat. Nos. 5,225,221 and 5,474,793, incorporated herein by reference in their entireties.

In still other embodiments, the liquid in the non-settling fruit beverage is added before any blending takes place. In yet more embodiments, the liquid in the non-settling fruit beverage is added while other non-settling fruit beverage ingredients are being manually mixed. In still another embodiment, the liquid in the non-settling fruit beverage is added before any blending takes place and while the non-settling fruit beverage ingredients are being manually mixed.

In another embodiment, ice, fruit and liquid are blended, frozen and crushed before this combination is placed in a container.

In other embodiments, fruit and liquid are blended, frozen and crushed before this combination is placed in a container.

In yet other embodiments, frozen fruit is blended, frozen and crushed before it is placed in a container.

In still other embodiments, non-frozen fruit and frozen fruit are blended, frozen and crushed before this combination is placed in a container.

In still more embodiments, the base in the non-settling fruit beverage comprises one or a plurality of: sherbet, frozen yogurt, sorbet, dairy-based ice cream, and non dairy-based ice cream such as ice cream made from soy or rice. There are a variety of processes for making a frozen base known in the art including, but not limited to the processes described in U.S. Pat. Nos. 6,432,466 and 6,352,734, incorporated herein by reference in their entireties.

In other embodiments, the base is low in natural or artificial sugars.

In yet more embodiments, the non-settling fruit beverage is one or a plurality of low in or free of: natural sugars, artificial sugars, fat, calories, acid, gluten, lactose, and carbohydrates. There are many processes achieve low sugar, fat, calorie, acid, gluten and carbohydrate drinks and drinks free of sugar, fat, calories, acid, gluten, lactose, and carbohydrates known in the art including, but not limited to the process described in U.S. Pat. No. 6,607,775, incorporated herein by reference in its entirety.

In still additional embodiments, the non-settling fruit beverage ingredients are frozen and stored below zero degrees Fahrenheit (e.g., to extend shelf life).

In other embodiments, the shelf life of the non-settling fruit beverage, frozen, is at least 24 months.

In yet another embodiment, one or a plurality of the ingredients in the non-settling fruit beverage are organic. In still another embodiment, one or a plurality of the ingredients in the non-settling fruit beverage are all-natural.

In still more embodiments, the user mixes the non-settling fruit beverage for 30 seconds or less to achieve the desired consistency.

In another embodiment, mixing the ingredients adds air and volume to the non-settling fruit beverage.

In another embodiment, thawing and mixing the ingredients decreases volume to the non-settling fruit beverage.

In a preferred embodiment, a rigid straw with rigid extensions such as fins is used to mix and consume the non-settling fruit beverage. There are many processes to mix drinks known in the art including, but not limited to the processes described in U.S. Pat. Nos. 4,561,782, and 6,527,433, incorporated herein by reference in their entireties.

In another embodiment, one or a plurality of containers are used to store, mix, thaw and consume the non-settling fruit beverage ingredients.

It is preferred that all of the storing, mixing, thawing and consuming of non-settling fruit beverage is performed in the same container (e.g., a single serve container).

In more embodiments, the one or plurality of containers used to store, mix, thaw and consumer the non-settling fruit beverage comprise one or a plurality of plastic, paper, cardboard, air, Styrofoam, metal, expanded polystyrene, other insulated synthetic materials, and other non-insulated synthetic materials.

In more embodiments, the container comprises of one or a plurality of layers. For example, an inner layer could be made of hard plastic, and an outer layer could be made of Styrofoam. In another example, an inner layer could be made of hard microwavable plastic that could be removed from an outer layer made of expanded polystyrene. In another example, the container could be a thermos that has at least two layers with air in between the layers. In yet another example, all of the layers could be made of paper or cardboard with air in between the layers to provide for insulation.

In other preferred embodiments, a multiple track freeze methodology is used to freeze non-settling fruit beverage ingredients in-line and in-proportion to what is needed to fill containers.

In preferred embodiments, one or a plurality of containers are microwavable.

In still other embodiments, one or a plurality of the non-settling fruit beverage ingredients are agitated while being frozen.

In preferred embodiments, nozzles are used to fill the non-settling fruit beverage ingredients in containers. There are many processes for nozzles to fill ingredients known in the art including, but not limited to the processes described in U.S. Pat. Nos. 6,732,771, and 6,805,543, incorporated herein by reference in their entireties. In another embodiment, nozzles are rotated or moved while they are filling the containers to ensure non-settling fruit beverage ingredients evenly fill the containers and/or are evenly dispersed throughout the containers.

In yet another embodiment, a container is rotated or moved while it is being filled to ensure non-settling fruit beverage ingredients evenly fill the container and/or are evenly dispersed throughout the container.

In another preferred embodiment, the fruit, liquid and ice are blended and placed in a container so that this blended mixture forms an outer core around the sides of the container, and the base is placed in the same container to form an inner core in the container.

In yet another embodiment, the non-settling fruit beverage contains the necessary human dietary needs so that it can be consumed as a meal replacement. For example, the non-settling fruit beverage has the necessary amount of calories, protein, carbohydrates, fat, vitamins and minerals so that it can be consumed as a meal replacement.

In another embodiment, consumers mix the ingredients together manually by spinning blades or fins inside the container. For example, these blades or fins can be spun by gears that are spun by turning, pumping or cranking a handle, by moving a lever up and or down, or by pulling a tab.

In still another embodiment, consumers mix the ingredients together by shaking the container that holds the ingredients.

In other embodiments, all of the necessary non-settling fruit beverage ingredients are combined in one container. To make the non-settling fruit beverage at home, the consumer dumps all of these ingredients into a home blender, and blends for a few seconds until the desired consistency is achieved. In some embodiments, the ingredients are separated by smaller containers within the larger container that holds all of the ingredients. In other embodiments, one or a plurality of ingredients are thawed before being dumped into the blender. In another embodiment, to aid in the home blending process, one or a plurality of ingredients are blended by the manufacturer before the ingredients are placed in containers and before the consumer acquires the non-settling fruit beverage ingredients.

In yet more embodiments, all of the necessary non-settling fruit beverage ingredients, except one or a plurality of liquids, are combined in one container. To make the non-settling fruit beverage at home, the consumer dumps all of these ingredients into a home blender, adds liquid, and blends for a few seconds until the desired consistency is achieved. In yet other embodiments, a fill line is present on one of the containers so that containers can easily measure the correct quantity of liquid to add.

In preferred embodiments, the blended mixture and the base are physically separated from one and other. The present invention is not limited by the manner in which they are separated. For example, in one embodiment, the blended mixture and the base are both contained within the same container and are separated from each other by one or a plurality of paper or plastic or metal partitions within the container. In another embodiment, the blended mixture and the base are both contained within the same container and are separated from each other by one or a plurality of chambers within the container. In another embodiment, one or a plurality of chambers that separate the blended mixture from the base are broken before mixing. In yet another embodiment, the blended mixture and the base are both contained within the same container and are separated from each other by one or a plurality of sheets. In another embodiment, one or a plurality of partitions or sheets that separate the blended mixture from the base are removed before mixing. In still another embodiment, the blended mixture and the base are placed in one or a plurality of layers on top of each other within the same container. In another embodiment, the blended mixture is placed on one side of a container and the base is placed on the other side of the container. In yet another embodiment, the blended mixture and the base are form one or a plurality of cores within the same container. In still other embodiments, the base forms a core the size and shape of a cylinder, and the blended mixture forms a cylinder with a doughnut hole in the center; where the base fills (e.g., completely fills) this doughnut hole. In yet another embodiment, within the same container, the base forms a core the size and shape of a ball, and the blended mixture surrounds (e.g., completely surrounds) the base on all sides.

EXAMPLES

Several examples of the present invention are provided below. These examples are provided in order to demonstrate and further illustrate certain preferred embodiments and aspects of the present invention and are not to be construed as limiting the scope thereof.

In one preferred embodiment of the invention, a smoothie is prepared in the following manner (referencing FIGS. 1-15): first, frozen raspberries, frozen strawberries, frozen blueberries, crushed ice, orange juice and cranberry raspberry juice are blended together at high speed for a period of time sufficient to form a paste with ice crystals; second, an extrusion nozzle 10 is used to fill this blended mixture around the sides of a paper cylindrical container 15 so that is forms an outer core 20; third, at the same time the nozzle 10 fills the container, another extrusion nozzle 11 is used to fill a combination of raspberry sorbet and vanilla frozen yogurt in the middle of the same container so that it forms an inner core 25; fourth, the container is sealed with a plastic liner 30 and a paper cover 35; fifth, the container 15 is placed inside a sixteen ounce Styrofoam cylindrical cup 40 lined with hard plastic 42, and is frozen and stored below ten degrees Fahrenheit for a period of time; sixth, the container 15 is removed from the cup 40, and the container 15 is heated in a microwave for thirty seconds or less; seventh, the contents of the container 15 are transferred to the sixteen ounce Styrofoam cylindrical cup 40 lined with hard plastic 42; eighth, a powdery vitamin supplement located in a small pouch 41 is added to the contents in the cup 40; ninth, the contents 53 are then manually mixed together with a metal spoon for thirty seconds or less so that enough air is added to the mixture to reach a mark on the cup 45 and until it forms a smooth, creamy, thick, paste-like consistency. The smoothie is then ready to be consumed with a plastic straw found attached to the cup 50.

In another preferred embodiment of the invention, a smoothie is prepared in the following manner: first, frozen peaches, frozen raspberries, crushed ice, apple juice and raspberry juice are blended together at high speed for a period of time sufficient to form a paste with ice crystals; second, this mixture is frozen using a multiple track freeze methodology 55 that freezes the mixture in-line and in-proportion to what is needed; third, the mixture is crushed; forth, an extrusion nozzle 10 is used to fill this frozen blended mixture around the sides of a Styrofoam cylindrical container 60 lined with a microwavable plastic 62 so that it forms an outer core 63 and so that the fill is ¾ of the way up the sides of the container; fifth, a combination of raspberry sorbet and vanilla frozen yogurt is moved to another extrusion nozzle 11 using a multiple track freeze methodology 55, and at the same time as the extrusion nozzle 10 fills the blended mixture into the container 60, the sorbet and frozen yogurt combination is filled in the middle of the same container by the extrusion nozzle 11 so that it forms an inner core 64 and so that the fill is ¾ of the way up the middle of the container and so that there is no space in between the sorbet and frozen yogurt combination and the blended mixture; sixth, the contents are covered with a plastic liner or film 65, for example, to keep the product from getting freezer burn; seventh, the container is covered with a cover with a hole in the top 66, and on top of this cover 66, a plastic lining or film 67 is placed; eighth, the contents are frozen and stored below zero degrees Fahrenheit for a period of time; ninth, the cover 66 and the lining 67 are removed, and the Styrofoam container 60 is separated from its plastic lining 62; tenth, the contents in the plastic lining are heated in a microwave for thirty seconds or less; eleventh, the plastic lining 62 is put back into the Styrofoam cup 60; twelfth, the contents are mixed together with a metal spoon for thirty seconds or less so that enough air is added to the mixture to reach a mark on the cup 70, and until it forms a smooth, creamy, thick, paste-like consistency; thirteenth, the plastic cover 66 is then put back onto container 60, and straw attached to the outside of the cup 71 is then inserted into cup through the hole in the plastic cover 72. The smoothie is then ready to be consumed with the straw.

In another preferred embodiment of the invention, a smoothie is prepared in the following manner: first, frozen cranberries, frozen strawberries, frozen blueberries, crushed ice, protein powder, sugar, multi-vitamin powder, cranberry juice and apple juice are blended together at high speed for a period of time sufficient to form a paste with ice crystals; second, a nozzle fills this blended mixture into a paper cylindrical container 80; third, another nozzle fills strawberry sherbet in a separate paper cylindrical container 81; fourth, both containers are sealed with a paper cover 35; fifth, one container is placed on top of the other, and both containers are placed in a sixteen ounce firm expanded polystyrene cup 83, and the cup is sealed with both a lid with a hole in it for a straw 66 as well as a plastic film 67; sixth, the cup 83 is frozen and stored below ten degrees Fahrenheit for a period of time; seventh, the containers 80 and 81 are removed from the cup 83, and the container 80 with the blended mixture is heated in a microwave for fifteen seconds; eighth, both the blended mixture and the sherbet are transferred back to the cup 83; ninth, the contents are manually mixed together with a spoon for thirty seconds or less so that enough air is added to the mixture to reach a mark on the cup 85, and until it forms a smooth, creamy, thick, paste-like consistency. The smoothie is then ready to be consumed with a plastic straw found attached to the cup 86.

Figure 1:
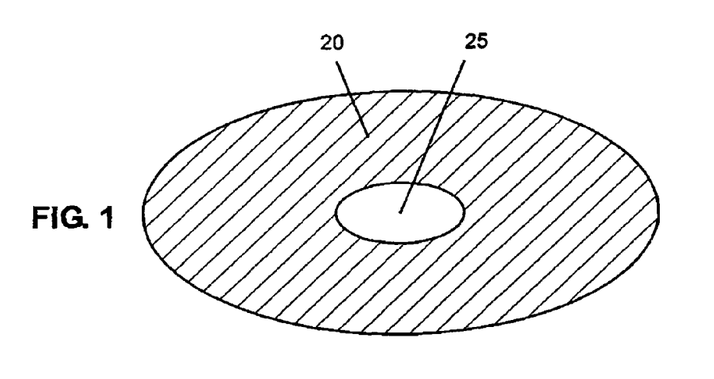
FIG. 1 shows a top view of a blended mixture around the sides of a paper cylindrical container so that is forms an outer core 20, and a base in the middle of the same container so that it forms an inner core 25.
Figure 2:
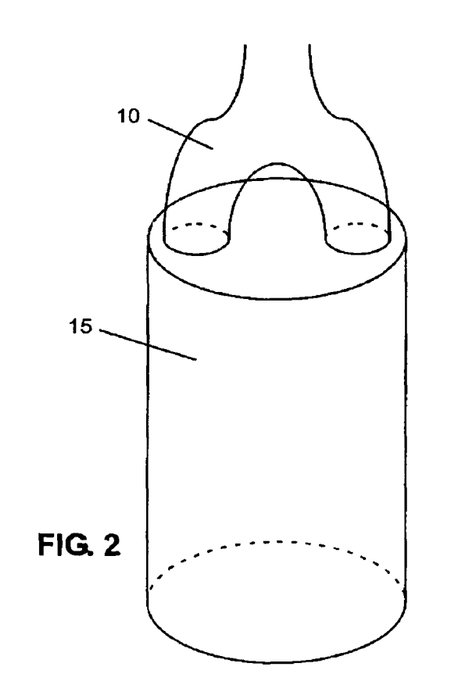
FIG. 2 shows an extrusion nozzle 10 filling the outer core of a paper cylindrical container 15.
Figure 3:
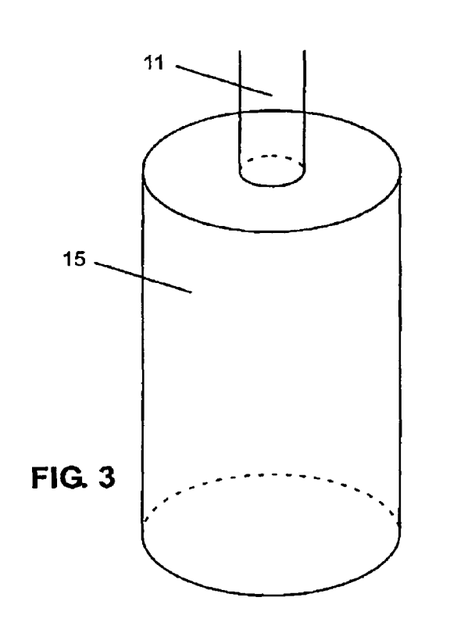
FIG. 3 shows an extrusion nozzle 11 filling the inner core of a paper cylindrical container 15.
Figure 4:
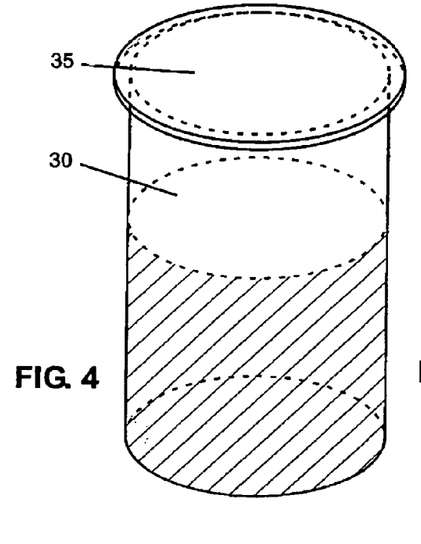
FIG. 4 shows a container with a paper cover 35 and a plastic liner 30 covering smoothie contents in the container.
Figure 5:
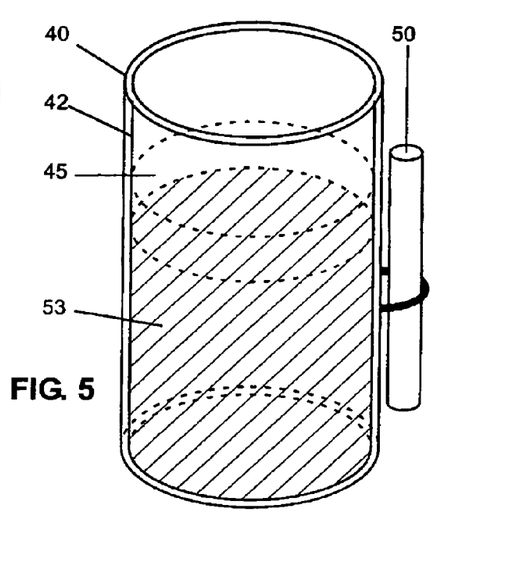
FIG. 5 shows smoothie contents 53 that have been transferred to a Styrofoam cylindrical cup 40 that has been lined with hard plastic 42. The smoothie is mixed to add enough air to increase volume to the mark 45. The smoothie is then consumed with the straw 50.
Figure 6:
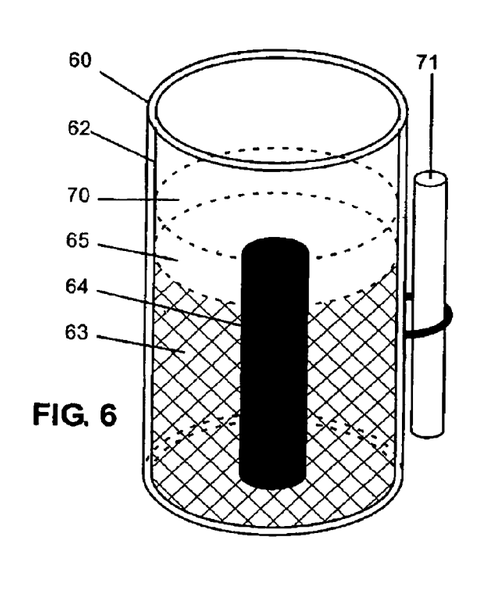
FIG. 6 shows a blended mixture 63 that has been filled around the outside of a Styrofoam cylindrical container 60 to form an outer core.
Figure 7:
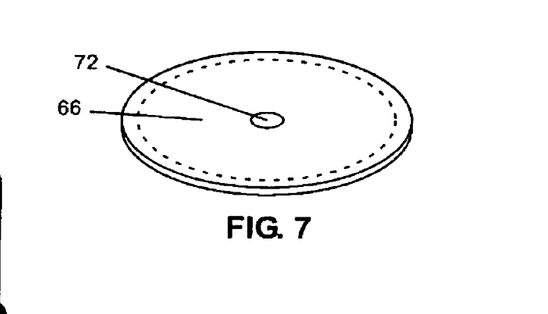
FIG. 7 shows a cover 66. The cover 66 has a hole 72 in the middle for a straw.
Figure 8:
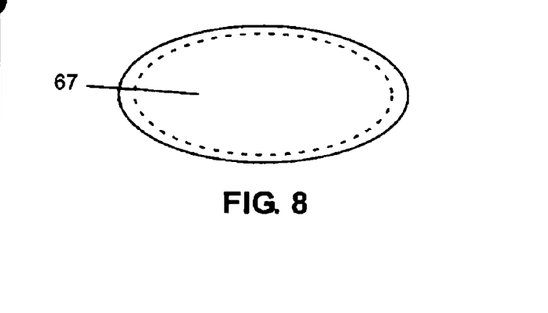
FIG. 8 shows the plastic lining 67 that is placed over the cover 66.
Figure 9:
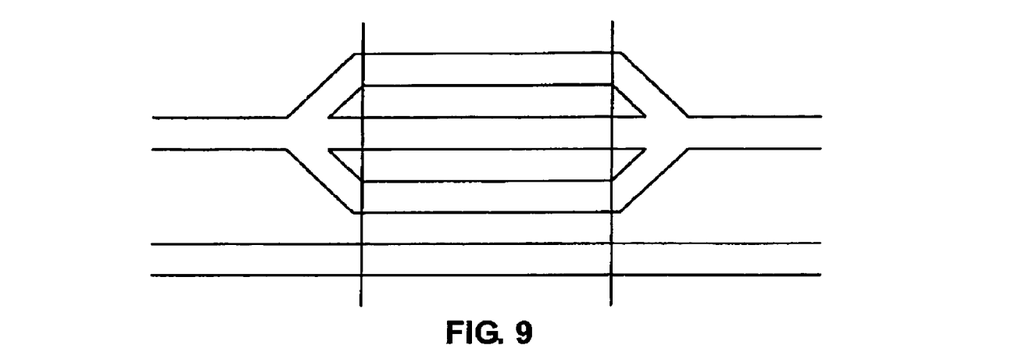
FIG. 9 shows a multiple track freeze methodology 55 for freezing and manufacturing the smoothie.
Figure 10:
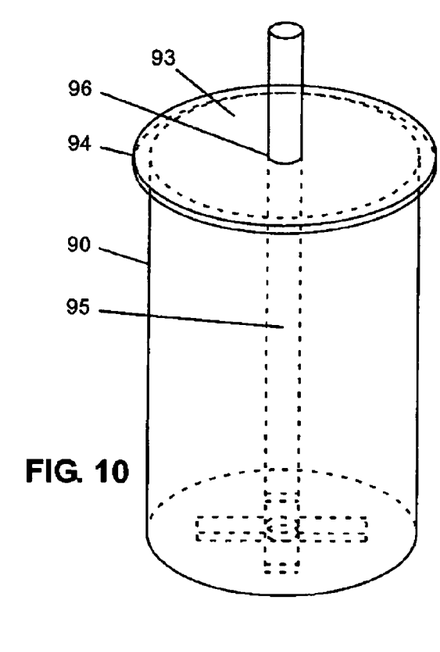
FIG. 10 shows a rigid straw with rigid extensions 95 in a hard microwavable polystyrene cylindrical container 90 with a lid 94 that has a hole in it for a straw 96. The lid 94 is covered by a plastic film 93 to finish sealing the container 90.
Figure 11:
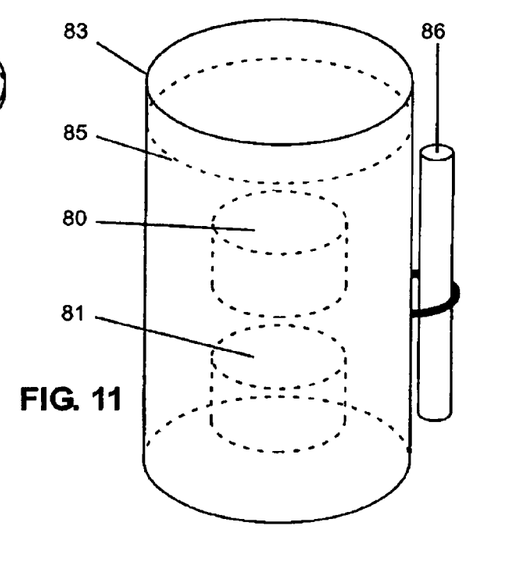
FIG. 11 shows sixteen ounce firm expanded polystyrene cup 83 that contains two additional containers: on top, a paper cylindrical container 80 containing a blended mixture, and on bottom, a paper cylindrical container 81 containing sherbet. When the ingredients in containers 80 and 81 are mixed, enough air is added so that the volume of the mixture reaches a mark on the cup 85. The smoothie is consumed with a straw 86.
Figure 12:
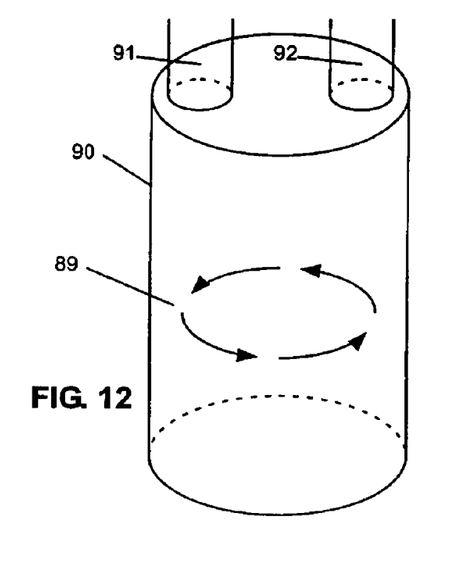
FIG. 12 shows a hard microwavable polystyrene cylindrical container 90 being filled with a blended fruit, ice and liquid mixture by a nozzle 91 and being filled with a sorbet and frozen yogurt mixture by a nozzle 92. The container 90 is being turned referenced by the arrows 89 to ensure that both the fruit, ice and liquid mixture and the sorbet and frozen yogurt mixture are evenly dispersed throughout the container in appropriate proportions.
Figure 13:
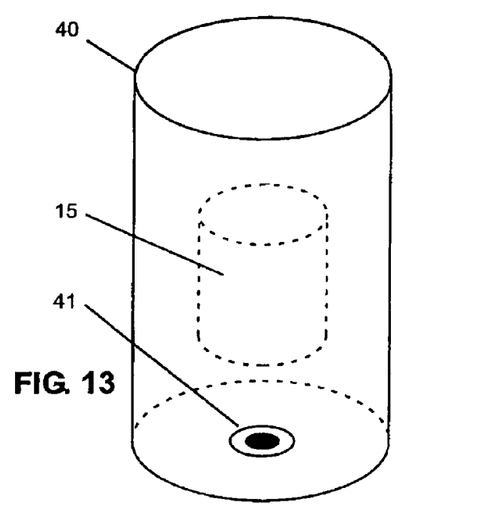
FIG. 13 shows a Styrofoam cylindrical cup 40 that contains a paper cylindrical container 15 that contains smoothie ingredients. Additionally, a powdery vitamin supplement in a small pouch 41 is located on the bottom of the cup 40.

In another embodiment of the invention, a smoothie is prepared in the following manner: first, bananas, frozen strawberries, crushed ice, orange juice and strawberry juice are blended together at high speed for a period of time sufficient to form a paste with ice crystals; second, a nozzle 91 is used to fill this blended mixture in a hard microwavable polystyrene cylindrical container 90 with a rigid straw with rigid extensions 95 inside it while the container 90 is spinning as diagramed in 89; third, at the same time as the nozzle 91 fills the container, a combination of low sugar strawberry sorbet and low sugar vanilla frozen yogurt is filled in the container by a nozzle 92 while the container 90 is spinning 89 so that the combination of both the blended mixture and the sorbet and frozen yogurt fills ¾ of the container, and so that both are evenly dispersed throughout the container in appropriate proportions; forth, the container is covered with a lid with a hole in the top 94 so that the rigid straw sticks up through the top 96; fifth, a plastic film 93 is placed over the lid 94 and the top of the straw 95; sixth, the contents are frozen and stored below zero degrees Fahrenheit for a period of time; seventh, the film 93 is removed; eighth, the contents in the container 90 are heated in a microwave for thirty seconds or less; ninth, the contents are mixed together with the rigid straw with rigid extensions 95 for thirty seconds or less until it forms a smooth, creamy, thick, paste-like consistency. The smoothie is then ready to be consumed with the rigid straw 95.

Figure 14:
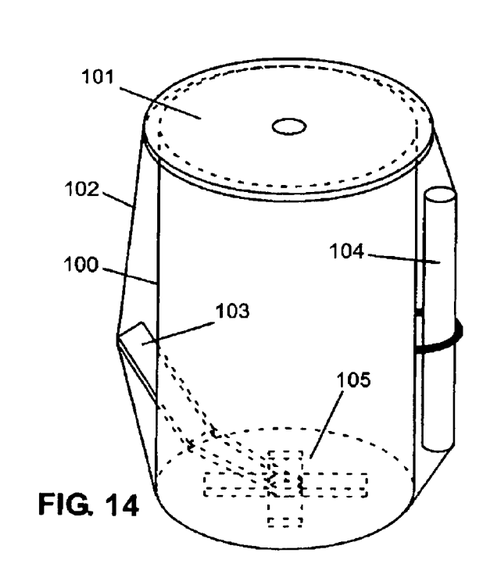
FIG. 14 shows a hard microwavable polystyrene cylindrical container 100 with plastic blades 105 inside it. The container is sealed with a lid with a hole in the top 101 and a plastic film 102 is placed over the entire container 100 and lid 101. Smoothie contents are mixed together by shaking the container 100 and by moving the lever 103 up and down causing the blades 105 to spin. The smoothie can consumed with the attached straw 104.
Figure 15:
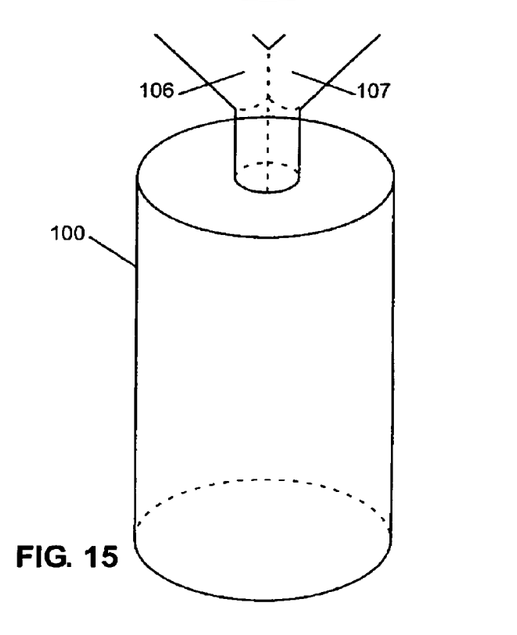
FIG. 15 shows nozzles 106 and 107 that are attached to each other. Nozzle 106 is used to fill the container 100 with a blended mixture, and nozzle 107 is used to fill the container 100 with sherbet and frozen yogurt.

In another embodiment of the invention, a smoothie is prepared in the following manner: first, frozen pineapple, frozen peaches, crushed ice, pineapple juice, apple juice, and coconut are blended together at high speed for a period of time sufficient to form a paste with ice crystals; second, a nozzle 106 is used to fill this blended mixture in a hard microwavable polystyrene cylindrical container 100 with plastic blades 105 inside it; third, at the same time as the nozzle 106 fills the container, a combination of low sugar peach sherbet and low sugar vanilla frozen yogurt is filled in the container by a nozzle 107 so that the combination of both the blended mixture and the sherbet and frozen yogurt fills ¾ of the container, and so that both are evenly dispersed throughout the container in appropriate proportions; forth, the container 100 is sealed with a lid with a hole in the top 101; fifth, a plastic film 102 is placed over the entire container 100 and lid 101; sixth, the contents are frozen and stored below ten degrees Fahrenheit for a period of time; seventh, the contents in the container 100 are heated in a microwave for thirty seconds; eighth, the container 100 is vigorously shaken for ten seconds; ninth, the film 102 is removed; tenth, the contents are mixed together by moving the lever 103 up and down for 10 seconds which turns one or a plurality of gears causing the blades 105 to spin; eleventh, the container 100 is vigorously shaken again for another five seconds. The smoothie is then ready to be consumed with the attached straw 104.

In yet another preferred embodiment of the invention, a smoothie is prepared in the following manner: first, a combination of the following ingredients in the following proportions is put in a blender –37.5 ml orange juice, 12.5 ml cranberry raspberry juice, one tablespoon apple sauce that does not contain any added sugar, sweeteners or high fructose corn syrup, five medium frozen strawberries, five ¼ inch slices of banana, and 37.5 ml crushed ice (25 ml water before freezing) and blended together at high speed for a period of time sufficient to form a smooth slurry-like paste with ice crystals void of any chunks; second, this mixture is frozen and then crushed to form a paste; third, a nozzle fills this mixture around the sides of a 16 oz triple layered insulated paper cup, and at the same time, another nozzle fills ⅓ of a cup of raspberry sorbet mixed with a teaspoon of vanilla frozen yogurt in the middle of the paper cup to form an inner cylindrical core; forth, the cup is covered and stored below 20 degrees Fahrenheit for a period of time; fifth, the cup is heated in a microwave oven for 45 seconds to slightly thaw the contents; sixth, the contents within the cup are stirred with a spoon for 5 seconds such that the heating and the stirring causes the total volume in the cup to slightly decrease; seventh, the smoothie is then ready to be consumed with a straw attached to the side of the cup.

In yet another preferred embodiment of the invention, a smoothie is prepared in the following manner: first, a combination of the following ingredients in the following proportions is put in a blender –30 ml Orange Juice, 37.5 ml Cranberry Raspberry Juice, one tablespoon apple sauce that does not contain any added sugar, sweeteners, or high fructose corn syrup, two medium frozen strawberries, ⅛ cup of frozen blueberries, ⅛ cup of frozen raspberries, and ⅛ cup of frozen marionberries and blended together at high speed for a period of time sufficient to form a smooth slurry-like paste with ice crystals void of any chunks; second, this mixture is frozen and then crushed to form a paste; third, ¾ of this mixture is filled around the sides of a 16 oz triple layered insulated paper cup, and ⅓ of a cup of raspberry sorbet mixed with a teaspoon of vanilla frozen yogurt is filled in the middle of the paper cup to form an inner cylindrical core; forth, the remaining ¼ of the blended mixture is placed in the paper cup covering the sorbet and frozen yogurt mixture; fifth, the cup is covered and stored below 20 degrees Fahrenheit for a period of time; sixth, the cup is heated in a microwave oven for 50 seconds; seventh, the contents within the cup are stirred with a spoon for 5 seconds, and then the smoothie is ready to be consumed with a straw attached to the side of the cup.

All publications and patents mentioned in the above specification are herein incorporated by reference. Various modifications and variations of the described method and system of the invention will be apparent to those skilled in the art without departing from the scope and spirit of the invention. Although the invention has been described in connection with specific preferred embodiments, it should be understood that the invention as claimed should not be unduly limited to such specific embodiments. Indeed, various modifications of the described modes for carrying out the invention that are obvious to those skilled in the relevant fields are intended to be within the scope of the following claims.

We claim:

1. A process for preparing a smoothie comprising the steps of:
   a. blending fruit, ice, and liquid together to form a blended mixture comprising ice crystals,
   b. placing said blended mixture resulting from step (a) in a first container,
   c. placing a base in a second container or in a portion of said first container not occupied by said blended mixture, wherein said blended mixture and said base are provided in one package,
   d. freezing and storing said blended mixture and said base unmixed below 32 degrees Fahrenheit in said one package,
   e. partially thawing said blended mixture such that said blended mixture retains ice crystals until said blended mixture can be mixed together with said base to form a smoothie, and
   f. mixing said blended mixture and said base to form said smoothie, wherein said smoothie retains ice crystals.

2. The process of claim 1, wherein the partial thawing of said blended mixture occurs through one or a plurality of the following: sitting at room temperature; being inside, on or near a heat source; and using a microwave oven.

3. The process of claim 1, wherein said base is partially thawed such that said base retains ice crystals before being mixed with said blended mixture.

4. The process of claim 1, wherein said blended mixture additionally comprises a supplement including one or a plurality of vitamins, minerals, herbs, protein, fiber, botanicals, teas, bioflavonoids, weight loss supplements, non-prescription drugs, and medicinals.

5. The process of claim 1, wherein said blended mixture additionally comprises one or a plurality of natural sweeteners, artificial sweeteners, coconut, peanut butter, nut butters, nuts, coffee, espresso, caffeine, chocolate, vanilla, cinnamon, spices, rhubarb, natural flavors, artificial flavors, natural coloring, artificial coloring, yogurt, oat bran, wheat bran, bran, whey, oil, seeds, pectin, cellulose, potatoes, preservatives, carrageenan, and wheatgrass.

6. The process of claim 1, wherein said fruit comprises one or a plurality of bananas, raspberries, blueberries, blackberries, strawberries, pineapples, cherries, peaches, passion fruit, mangos, papayas, guavas, apples, pears, boysenberries, gooseberries, star-fruit, apricots, plums, grapes, nectarines, pomegranates, limes, lemons, oranges, marionberries, and cranberries.

7. The process of claim 1, wherein said liquid contains one or a plurality of fruit juice, fruit nectar, fruit puree, apple sauce, fruit cider, vegetable juice, vegetable nectar, vegetable puree, water, juice concentrate, alcohol, non-dairy based milk such as soy or rice milk, dairy based milk such as cow milk, non-dairy based cream, and dairy-based cream.

8. The process of claim 1, wherein said base comprises one or a plurality of:
   sherbet, frozen yogurt, sorbet, dairy-based ice cream, and non dairy-based ice cream such as ice cream made from soy or rice.

9. The process of claim 1, wherein said blended mixture and said base are mixed before consumption by one or a plurality of being: crushed, smashed, churned, stirred, and shaken.

10. The process of claim 1, wherein said blended mixture and said base are mixed in 30 seconds or less.

11. The process of claim 1, wherein said first and second containers are stored inside a third container.

12. The process of claim 1, wherein said first and second containers are microwavable.

13. The process of claim 1, wherein said base is placed in said first container.

14. The process of claim 13, wherein said blended mixture and said base are individually placed in said first container.

15. The process of claim 13, wherein said base and said blended mixture are placed next to each other so that said blended mixture forms an outer core and said base forms an inner core such that said blended mixture is placed against said first container walls and said base is placed against said blended mixture, wherein said base and said blended mixture are separated by a partition contained within said first container.

16. The process of claim 13, wherein said base and said blended mixture are placed next to each other so that said blended mixture forms an inner core and said base forms an outer core such that said base is placed against said first container walls and said blended mixture is placed against said base, wherein said base and said blended mixture are separated by a partition contained within said first container.

* * * * *